United States Patent
Yoshizoe et al.

(10) Patent No.: US 7,564,407 B2
(45) Date of Patent: Jul. 21, 2009

(54) DIRECTIVITY CONTROL APPARATUS OF ARRAY ANTENNA AND DIRECTIVITY CONTROLLING METHOD

(75) Inventors: Kazuki Yoshizoe, Koganei (JP); Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/984,363

(22) Filed: Nov. 16, 2007

(65) Prior Publication Data

US 2008/0238773 A1 Oct. 2, 2008

(51) Int. Cl.
*G01S 5/02* (2006.01)
*H01Q 3/00* (2006.01)
(52) U.S. Cl. .................................. 342/422; 342/372
(58) Field of Classification Search ................. 342/368, 342/372, 374, 422, 433
See application file for complete search history.

(56) References Cited

U.S. PATENT DOCUMENTS

| | | | | |
|---|---|---|---|---|
| 5,648,987 A | * | 7/1997 | Yang et al. | 375/232 |
| 6,069,912 A | * | 5/2000 | Sawahashi et al. | 375/142 |
| 2002/0151301 A1 | * | 10/2002 | Miyoshi | 455/423 |
| 2002/0191580 A1 | * | 12/2002 | Ishii et al. | 370/342 |
| 2004/0033818 A1 | | 2/2004 | Nakamura | |

FOREIGN PATENT DOCUMENTS

| | | |
|---|---|---|
| JP | 2001-069054 | 3/2001 |
| JP | 2002-171214 | 6/2002 |
| JP | 2003-032167 | 1/2003 |

* cited by examiner

*Primary Examiner*—Dao L Phan
(74) *Attorney, Agent, or Firm*—Hanify & King, P.C.

(57) ABSTRACT

An array antenna directivity control apparatus for use in tracking a target updates a weighting coefficient based on an error between antenna signals of multiple antennas and a known reference signal, and corrects an amount of updating for each of the weighting coefficients. The updating is performed based on predict error information predicted based on past errors. As a result, it is possible to adjust a weighting coefficient based on a prediction of the next position of a target. Thus, it is possible to track a target which is being moving at high speed with a small amount of calculation.

10 Claims, 10 Drawing Sheets

DIRECTIVITY CONTROL APPARATUS OF ARRAY ANTENNA AND DIRECTIVITY CONTROLLING METHOD

CROSS REFERENCE TO RELATED APPLICATION(S)

This application is based on and hereby claims priority to PCT Application No. PCT/JP2005/009353 filed on May 23, 2005 in Japan, the contents of which are hereby incorporated by reference.

BACKGROUND OF THE INVENTION

1) Field of the Invention

The present invention relates to technology for a directivity control apparatus and directivity controlling method. In particular, the invention relates to technology suitable for controlling directivity of an array antenna by means of adaptively updating a weighing coefficient with respect to each antenna signal of an array antenna.

2) Description of the Related Art

An array antenna is a scheme in which multiple antennas receive signals, and for each antenna, a weighting coefficient (weight) is given to a reception signal to separate signals from a specific direction.

As shown in FIG. 7, for example, signals received through multiple (four in FIG. 7) antennas 100 are multiplied, by the multiplier 101 for each antenna 100, by weighting coefficients $w_0$, $w_1$, $w_2$, and $w_3$. These weighting coefficients $w_0$, $w_1$, $w_2$, and $w_3$ are updated (controlled) by the weight updater 104 on the basis of a difference (error) e which is obtained by the adder 103 by comparison of a reception signal having been added (combined) by the adder 102 with a pilot signal that is an already known reference signal.

As a result, effects and benefits such as that a gain is raised in an specific direction, or interference is eliminated by aiming null at in a specific direction. In this instance, the distance among the antennas 100 is often used 1 wavelength or 0.5 wavelength of a reception signal (or transmission signal).

FIG. 8 shows an example of directivity of an array antenna using a certain weight. From FIG. 8, the array antenna has strong directivity (or null points) in six directions. In this manner, giving directivity is called beam forming.

(2) Adaptive Array Antenna

When the direction of the target is already known, it is easy to set a weighting coefficient. For example, the method of using GPS (Global Positioning System) can be usable. However, in mobile communication, the direction of the target is normally unknown. Thus, a weighting coefficient is set using algorithm such as NLMS (Normalized Least Mean Square).

Here, referring to FIG. 9, a specific operation (updating of a weighting coefficient) if an adaptive array antenna using the NLMS method is explained. Simply, an already known pilot signal (pattern) is compared to a reception signal to obtain an error e. In order to make the square of the error e become the minimum, a weighting coefficient $w_m$ [m represents the number of the antenna, m=0, ..., M−1 (M is an integer not smaller than 2)] is changed.

That is, when a reception signal of each antenna 100 is $X_m$, and a signal obtained after beam forming (that is, an output signal of the adder 102) is y, y is expressed by the following formula (1.1)

$$y = \Sigma w_m x_m \quad (1.1)$$

Further, as to a pilot signal, as shown in the following formulas (1.2) and (1.3), a normalized coefficient P and the amplitude A of a reference symbol are calculated.

$$P = \sum_{m=0}^{M-1} |x_m|^2 \quad (1.2)$$

$$A = \sqrt{\frac{1}{M} \sum_{m=0}^{M-1} |x_m|^2} \quad (1.3)$$

Further (for example, by normalizing a channel estimation value $\xi$), a phase term $\Phi$ is obtained by the following formula (1.4).

$$\Phi = \frac{\xi}{|\xi|} \quad (1.4)$$

As described above, the error e is obtained by the following formula (1.5). Here, d expresses a pilot pattern.

$$e = A\Phi d - y \quad (1.5)$$

In FIG. 9, an arithmetic operation by this (1.5) is realized by means of the multipliers 105 and 106 and the adder 103. The weight updater 104 updates the weighting coefficient using this error e. When the current weighting coefficient is $w_m$, and when the updated weighting coefficient is $w_m'$, a new weighting coefficient $w_m'$ is obtained by the following formula (1.6).

$$w_m' = w_m + (\mu/P) e x_m \quad (1.6)$$

In the formula (1.6), $\mu$ is a step factor. In FIG. 9, the present formula (1.6) is realized by the multipliers 141, 142, and 143, the adder 144, and the weighting coefficient holder 145. That is, a reception signal $x_m$ of each antenna 100 is multiplied by an error e, a normalized 1/P, a step factor $\mu$ by means of the multipliers 141, and 142, and 143 to obtain the second term [$(\mu/P) e x_m$, to which the current weighting coefficient $w_m$ [the first term of the above formula (1.6)] held in the weighting coefficient holder 145 is added by the adder 144. As a result, a new weighting coefficient $w_m'$ is obtained.

In this manner, as the weighting coefficient $w_m$ is updated, the beam direction is changed to the direction such that the error e becomes zero, as shown in FIG. 10(A), for example. Accordingly, when the step factor $\mu$ is made to be "1" (when effect by noise is absent), a beam turns to the target by one step. However, effects of noise cannot be disregarded. Here, the above formula (1.6) converges when the above formula (1.6) is 0<$\mu$<1. Hence, as shown in FIG. 10(B), the beam direction is controlled in such a manner that the error e after one step turns to be (1−$\mu$)×error e.

Here, if the step factor $\mu$ is large, conversion is fast, but is subjected to effects of noise etc. Thus, it converges while vibrating largely. In addition, after the convergence, the beam direction is fishtailed and unstable, and as a result, the error e becomes large. Thus, a considerable small value is normally set to the step factor $\mu$. However, if the step factor $\mu$ is small, convergence is delayed.

That is, in a case of using NLMS algorithm, if the direction of the target does not move, it converges at some future time. However, when using in mobile communication, it is necessary to track a moving target (mobile terminal). When the target is fixed, it becomes insensitive when the step factor $\mu$ is small so that an error rate becomes low, but since conversion is delayed, it becomes impossible to track the target which is being moving in high speed.

Thus, in the present situation, the step factor μ is adjusted in consideration with trade off between the speed of convergence and the largeness of an error e after convergence. That is, it can be said that NLMS is not an algorithm generally suitable when the target moves. Hence, an algorithm which can support a fixed target and a target which is moving in high speed is desired.

In this instance, the following patent document 1 proposes the previous art in which prediction is performed using information in past, and the beam direction (directivity) is controlled.

In this technique, a reception signal (reception response vector) is divided into frequency components (signal wave form for each frequency). By means of making time t large, changes of the signal form of each frequency is predicted, and by means of combining the signal forms at that time, a reception vector at time t is estimated. As a result, it is prevented that an error is caused by the effect of fading, as in the case of extrapolation, so that a transmission response vector can be estimated. Accordingly, even if the terminal moves faster, and the degree of fading is extreme (in the circumstance when a Doppler frequency is high), it is possible to accurately control transmission directivity.

However, it can be said that this technique is a significantly rough method from the view of directivity control. That is, in the previous art, a reception signal is divided into a signal wave form for each frequency, and its coefficient is obtained. By means of predicting changes in the signal wave form for each frequency, and combining the signal wave form at that time. In this manner, a transmission response vector is estimated by estimating a reception response vector. Thus, precise directivity control cannot be expected regardless of the number of antennas. That is, when the number of antenna is increased, and the beam form for each antenna becomes small, it can become impossible to accurately track the target.

In addition, it is necessary that a transmission weight vector is calculated by using an algorithm such as Winner solution from the estimated transmission response vector. Thus, a great amount of calculation is needed to obtain the final transmission weight vector (weighting coefficient). As a result, it can become impossible to track a target which is moving in high speed.

With the foregoing problems in view, it is an object of the present invention to make it possible to perform detailed directivity control of an antenna beam with a small amount of calculation in an array antenna, and also to make it possible to accurately track a target which is moving in high speed.

[Patent Document 1] Japanese Patent Application Laid-Open No. 2003-32167

SUMMARY OF THE INVENTION

In order to accomplish the above object, according to the present invention, there are provided the following antenna directivity control apparatus and directivity controlling method.

(1) As a generic feature, there is provided an array antenna directivity control apparatus which changes directivity of a plurality of antennas by updating adaptively a weighting coefficient with respect to a signal of each of the antennas, the array antenna directivity control apparatus comprising: weighting coefficient updating means which updates the weighting coefficient based on an error between the antenna signal and a known reference signal; and update amount correcting means which corrects an amount of updating for each of the weighting coefficients, which updating is performed by the weighting coefficient updating means, based on predict error information predicted on the basis of the error in past.

(2) As a preferred feature, the update amount correcting means includes: a predict error information calculator which obtains the predict error information based on differences among a plurality of errors in past; and an adder which performs the correction by means of adding the predict error information obtained by the predict error information calculator to the amount of updating of each of the weighting coefficients.

(3) As another preferred feature, the predict error information calculator obtains a primary difference with respect to the plurality of errors in past.

(4) As yet another preferred feature, the predict error information calculator obtains an average of primary differences with respect to the plurality of errors in past.

(5) As a further preferred feature, the predict error information calculator obtains the predict error information based on a difference with respect to the normalized error.

(6) As a further more feature, the predict error information calculator obtains the predict error information based on an error which is obtained by multiplying an error used to obtain the amount of updating, obtained by the update amount correcting means, by an amount according to a predetermined updating width.

(7) As another preferred feature, the update amount correcting means include: an evaluator which evaluates whether or not the amount of updating is to be corrected by the predict error information based on the predicted error information obtained by the predict error information calculator.

(8) As yet another preferred feature, the evaluator evaluates whether or not the amount of the updating is to be corrected by comparing the predict error information with threshold value of the amount of updating.

(9) As still another preferred feature, the evaluator evaluates whether or not the amount of updating is to be corrected by comparing a proportion of the amount of updating and the predict error information with threshold value of the proportion.

(10) As a further preferred feature, the predict error information calculator includes: an object error number adjustor which adjusts the number of multiple errors in past used to obtain the predict error information.

(11) As a generic feature, there is provided an array antenna directivity control method which changes directivity of a plurality of antennas by updating adaptively a weighting coefficient of a signal of each of the antennas, the method comprising the steps of: updating the weighing coefficient based on an error between the antenna signal and a known reference signal; and correcting an amount of updating for each of the weighting coefficient, which updating is performed at the updating, based on predict error information predicted on the basis of the error in past.

The above described invention provides the following advantageous results.

(1) Since the next position of the target can be predicted and a weighting coefficient is adjusted (corrected) beforehand, it is possible to accurately track a target which is moving in high speed.

(2) In addition, it is possible to control the beam direction (directivity) by means of a simple calculation such as adding predict error information when updating individual weighting coefficient. Hence, a great amount of calculation as in the case of the previous case is unnecessary, and it is possible to realize directivity control in high speed with an extremely small amount of calculation. Accordingly, when the number of antennas is increased, resulting in small beam form for each antenna, it is possible to accurately track the target.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

DESCRIPTION OF THE PREFERRED EMBODIMENT(S)

Figure 1:
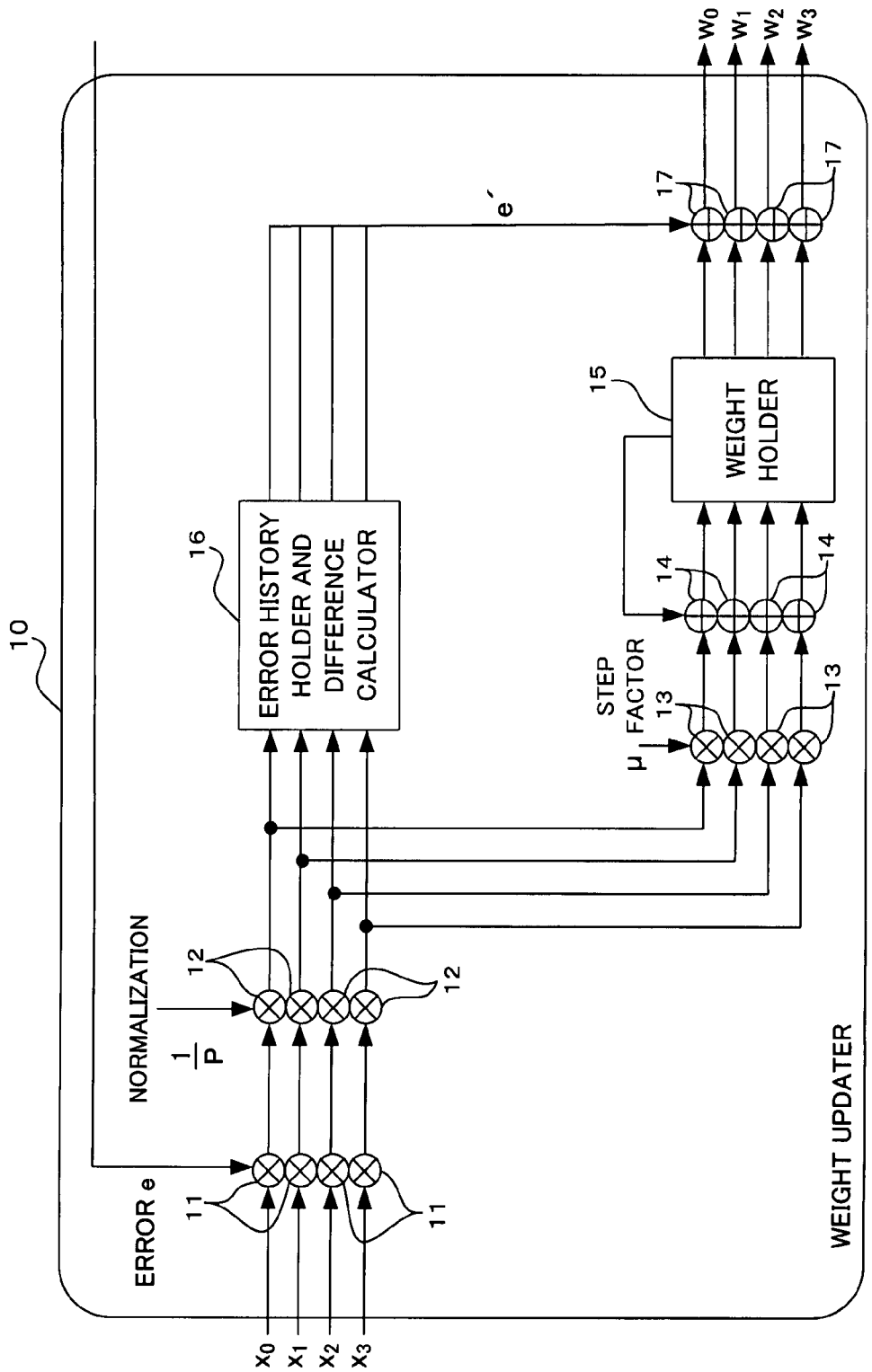
FIG. 1 is a block diagram showing a construction of a weight updater (array antenna beam control apparatus) which is applied to a receiving system of an array antenna according to one preferred embodiment of the present invention.

Referring to the drawings, a description will be made hereinafter of one preferred embodiment of the present invention.

[1] Description of one Embodiment:

FIG. 1 is a block diagram showing a construction of a weight updater (array antenna beam control apparatus) applied to an array antenna receiving system as a preferred embodiment of the present invention. A weight updater 10 illustrated in FIG. 1 is applied to the same position of a weight updater 104 in a receiving system of the adaptive array antenna, which has already been described with reference to FIG. 9. The updater 10 has, for each antenna 100 (see FIG. 9), multiple (in FIG. 1, four) multipliers 11, 12, and 13, multiple (four) adders 14, and multiple (four) adders 17. In addition, the updater 10 has a weighting coefficient (weight) holder 15, and an error history holder and difference calculator 16.

Figure 9:
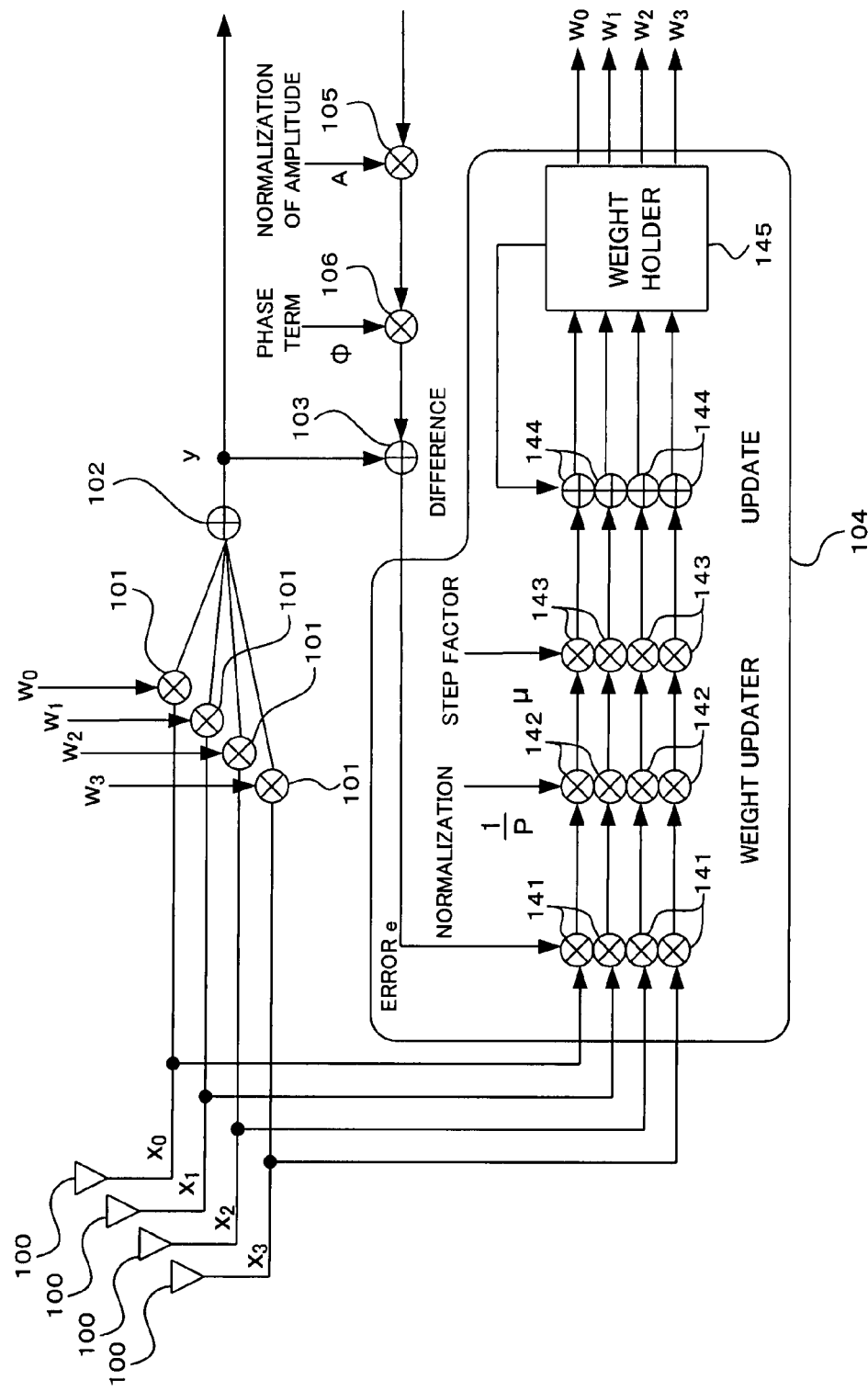
FIG. 9 is a block diagram showing a construction example of a previous adaptive array antenna (receiving system).
Figure 10A:
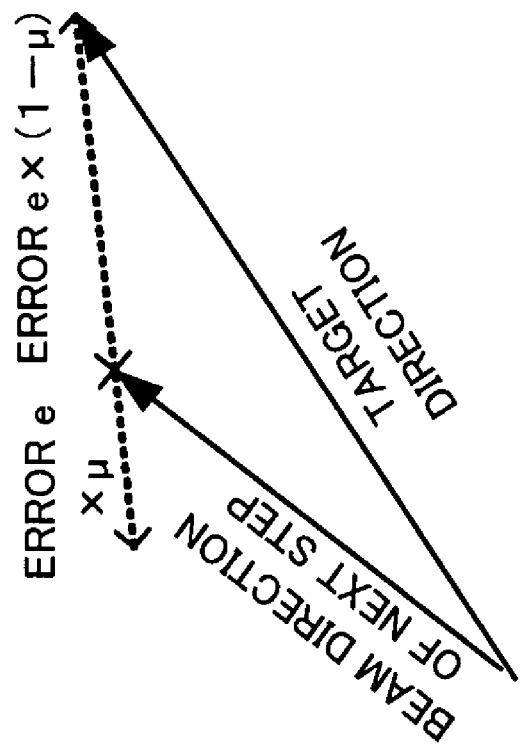
FIG. 10(A) and FIG. 10(B) each are diagrammatic illustrations for describing directivity control by a previous adaptive array antenna.
Figure 10B:
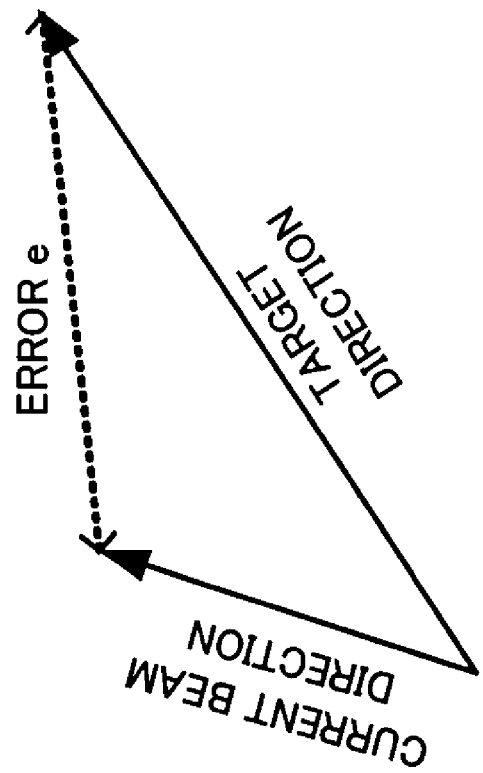

That is, the weight updater 10, in comparison with the weight updater 104, which has already been described referring to FIG. 9, is different in that a system including the error history holder and difference calculator 16 and the adders 17 is added.

Here, each multiplier 11, the same as the multiplier 141, multiplies a signal received by an antenna 100 (antenna signal) $x_m$ [m is the number of the antenna, m=0, ..., M−1 (M is an integer not smaller than 2)] by an error e obtained by the adder 103 (see FIG. 9). Each multiplier 12, similar to the multiplier 142 shown in FIG. 9, multiplies an output of the multiplier 11 by a normalized coefficient 1/P. Each multiplier 13, similar to the multiplier 143 shown in FIG. 9, multiplies an output of the multiplier 12 by a step factor $\mu$.

That is, in the present example, also, the multipliers 11, 12, 13 obtains the second term $[(\mu/P)ex_m]$ in the formula (1.6).

Further, a weighting coefficient (weight) 15, similar to the weighting coefficient holder 145 shown in FIG. 9, holds the current weighting coefficient $w_m$ for each antenna 100. Each adder 14, similar to the adder 144 shown in FIG. 9, adds the current weighting coefficient $w_m$ held in a weighting coefficient holder 15 to an output $(\mu/p)ex_m$ of the adder 14, thereby obtaining a new (updated) weighting coefficient $w_m'$ which is expressed by the formula (1.6) (performing the weighting facet updating step).

That is, a part composed of the above-mentioned multipliers 11, 12, and 13, the adder 14, and the weighting coefficient holder 15 functions as a weighting coefficient updating means which updates the weighting coefficient $w_m$ with respect to each antenna based on an error e between an antenna signal and a known reference signal such as a pilot signal.

Then, the error history holder and difference calculator (predict error information calculator) 16 stores the normalized error e/P of n step (n is an integer not smaller than 1) in past as $e_0, e_1, \ldots, e_n$, and calculates and stores a primary difference [corresponding to objective (target) movement speed] of the error e of the n step in past. In the present example, when calculating a difference, the difference in past is multiplied by $(1-\mu)$, as shown in the following formula (2.1) under a reason which will be described later.

$$e_0' = e_0 - (1-\mu)e_1$$

$$e_1' = e_1 - (1-\mu)e_2$$

$$e_{n-1}' = e_{n-1} - (1-\mu)e_n \quad (2.1)$$

Further, this error history holder and difference calculator 16 stores an average of the primary difference $(e_0', e_1', \ldots, e_{n-1}')$ of the errors of such n steps in past, as e' (predict error information).

Figure 2:
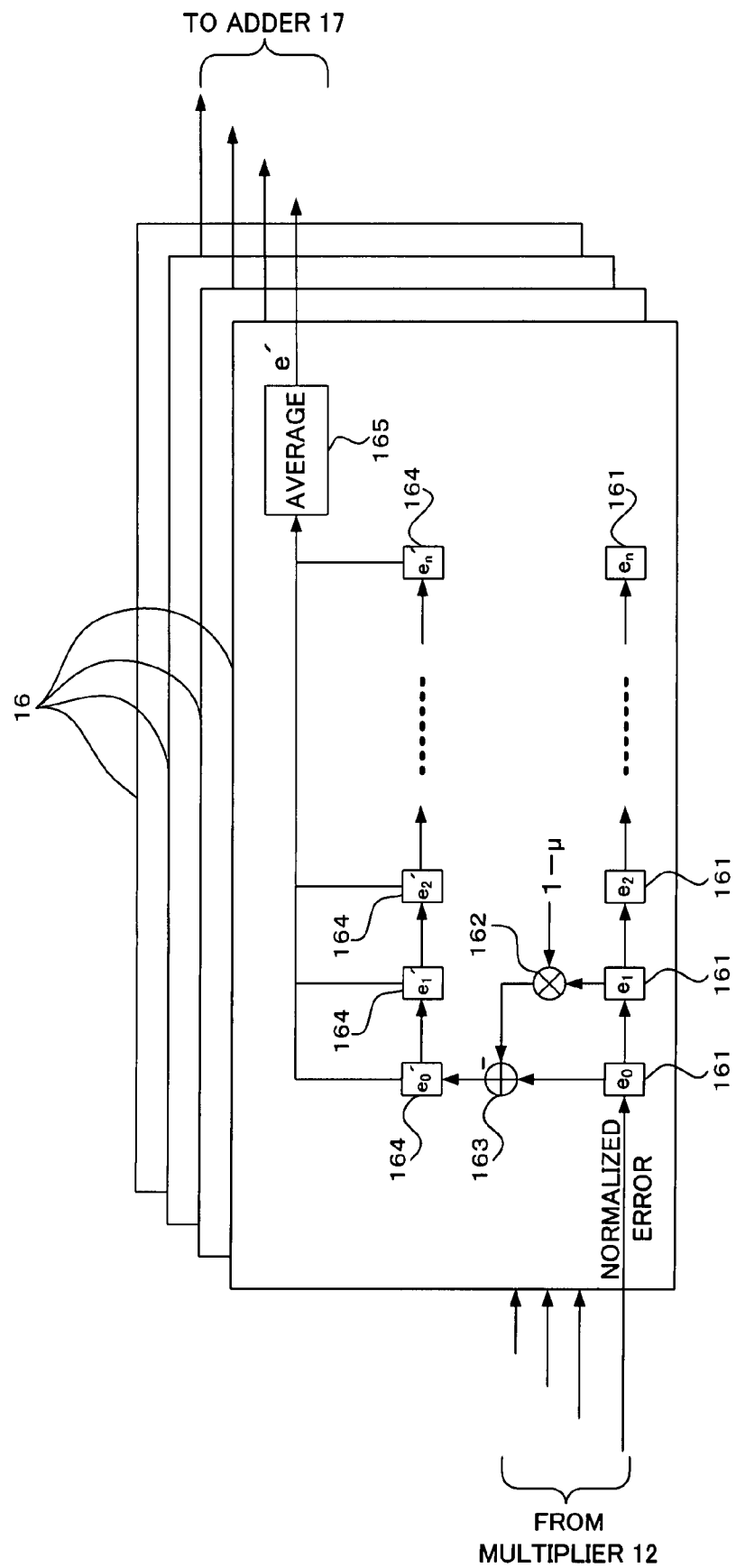
FIG. 2 is a block diagram showing a construction example of an error history holder and difference calculator shown in FIG. 1.

For this purpose, as shown in FIG. 2, for example, the error history holder and difference calculator 16 includes: a latch 161 for holding the history of the normalized error e/P of n steps in past as $e_0, e_1, \ldots, e_n$; an multiplier 162 for multiplying the above $(1-\mu)$; an negative adder (subtractor) 163 for obtaining the above mentioned each primary difference $e_0', e_1', \ldots, e_{n-1}'$; a latch 164 for holding the subtraction result of these subtractor 163; an averaging unit 165 which obtains an average of the values (the primary difference $e_0', e_1', \ldots, e_{n-1}'$) held in these latch 164. In this instance, these elements (blocks) are independently provided for each antenna 100.

Next, each adder 17 in FIG. 1, adds the average e' of the above primary difference $(e_0', e_1', \ldots, e_{n-1}')$ obtained by the error history holder and difference calculator 16 to the weighting coefficient $w_m$ output from the weighting coefficient holder 15, thereby updating the weighting coefficient $w_m$.

That is, given that the current weighting coefficient is $w_m$, and that the updated weighting coefficient is $w_m'$, the error history holder and difference calculator 16 and the adders 17 update the weighting coefficient by means of the following formula (2.2) (update amount correcting step).

$$w_m' = w_m + (x/P)\mu e_0 + e' \quad (2.2)$$

Figure 3:
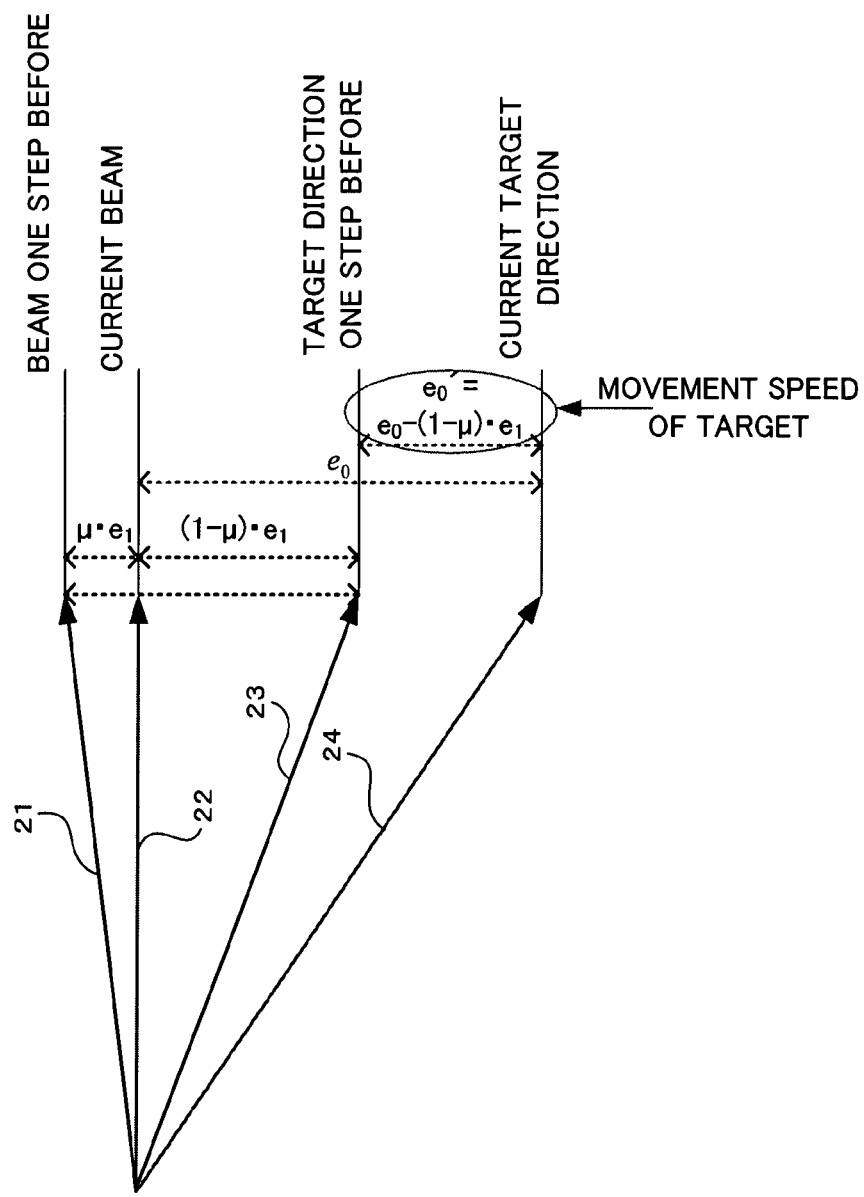
FIG. 3 is a diagram showing an image of directivity control operation performed by the weight coefficient updater shown in FIG. 1.

This is a method of adjusting the weighting coefficient $w_m$ by predicting the next position of the target beforehand. For example, FIG. 3 shows an operation image of updating (operation) of a beam direction by the above algorithm. As shown in FIG. 3, provided that the target is doing a uniform straight line movement, the current beam direction 22 (the direction updated by $\mu e_1$ from the beam direction 21 one step before) is to be updated to the beam direction to the current target direction 24 by the beam direction $e_0$. Taking the target direction 23 as a reference before one step, the difference $e_0'$ [$=e_0-(1-\mu)e_1$] from the direction 23 should be obtained.

Accordingly, the above formula (2.2) means that it is possible that a target which is moving in high speed can be accurately followed by means of predicting the next position of the target and correcting the weighting coefficient $w_m$ by the predict term e'. That is, the error history holder and difference calculator 16 and the adders 17 function as an update amount correcting means which corrects the update amount of the weighting coefficient $w_m$ based on the predict error information e' predicted on the basis of the above error e in past.

In addition, in the present example, it is possible to control beam direction (directivity) by a simple calculation of a predict addition term e' at the time of updating dependent weighting coefficient $w_m$. Thus, a great amount of calculation as in a previous case is unnecessary, and it is possible to realize high-speed directivity control with a significantly small amount of calculation amount, without necessity of a great amount of calculation as previously. Accordingly, even when the number of antenna is increased and the beam shape for one antenna becomes small, it is possible to accurately follow the target.

In this instance, in the above formula (2.1), the reason for multiplying $(1-\mu)$ by the error in past, is because the updating amount of final weighting coefficient, as shown in the formula (2.2), is $(x/P)\mu e_0+e'$, and then if the difference is calculated without multiplying $(1-\mu)$, e' of the updated by the term of $\mu e_0$, the amount to be updated by the term of $\mu e_0$ is vanished by the term of e'. The reason if the same as in the case where the term of the $\mu e_0$ is the same as using the normal NLMS, but if the difference is simply calculated, the updated amount e' of this term is cancelled. Thus, by means of multiplying the amount $(1-\mu)$ corresponding to the amount the step factor $(1-\mu)$, the value of e' is calculated based on the difference other than the amount of updated NLMS by means of multiplying a step factor (a predetermined update width) $(1-\mu)$, thereby calculating the value of e' based on the difference other than the amount updated by NLMS.

That is, the error history holder and difference calculator 16 obtain predictive term e' based on the error obtained e used to obtain the update amount of the above weighting coefficient $w_m$ by multiplying a step factor (predetermined update width) multiplied by a corresponding amount of $(1-\mu)$.

Figure 4:
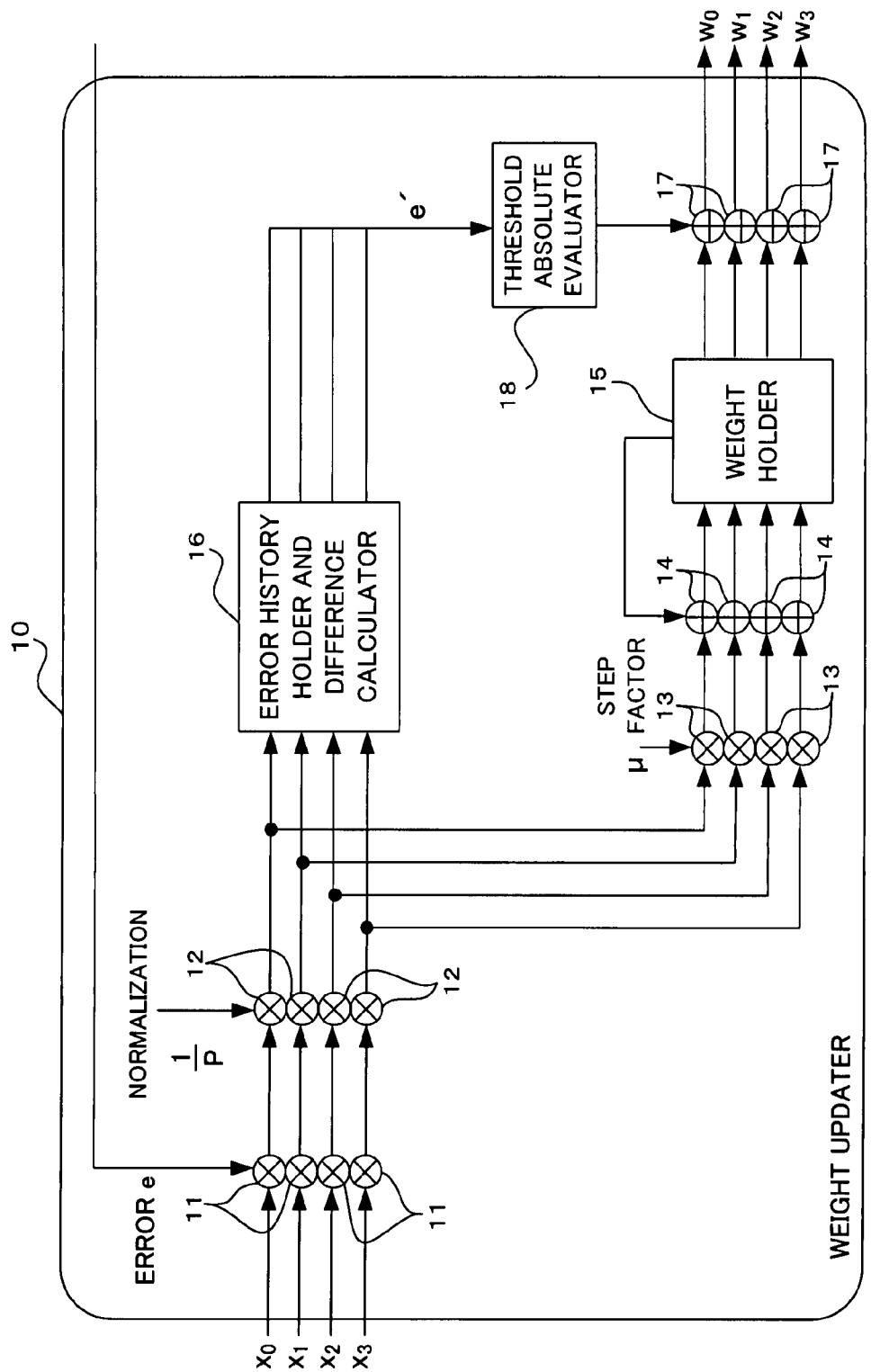
FIG. 4 is a block diagram showing a first modified example of the weight coefficient updater shown in FIG. 1.

[2] First Modified Example:

FIG. 4 is a block diagram showing a first modified example of the above-described weight updater 10. In comparison with the construction already described with reference FIG. 1, the weight updater 10 in FIG. 4 differs in that the error history holder and difference calculator 16 has a threshold absolute evaluator 18. In this instance, elements described with reference characters the same as the reference characters already described are the same as or similar to the already described elements, unless it is particularly mentioned.

Here, the above threshold absolute evaluator 18 evaluates whether or not the update amount of the weighting coefficient $w_m$ is to be corrected with the error e' based on the error e' obtained by the error history holder and difference calculator 16. In this example, the error (predict error) e' obtained by the error history holder and difference calculator 16 is compared with a threshold value relating to the error e'. If the e' is not smaller than the threshold value, the error e' is output to the adder 17. On the other hand, if the error e' is smaller than the threshold value, the error e' is not output to the adder 17.

That is, when the error e' is smaller than the threshold value and is small (for example, in a case where the target is not almost being moving), the error e' is not used in correction of the weighting coefficient $w_m$ (operation due to a normal NLMS algorithm is performed).

Hereby, when the target is moving in high speed (when the error e' is not smaller than the threshold value and large), as in the case of the above described embodiment, the errors e' obtained by the error history holder and difference calculator 16 is output to the adder 17, and is added to the update amount $(x/P)\mu e_0$ of the weighting coefficient $w_m$, and correction is performed. In contrast, when the target is not almost moving (when the error e' is smaller than the threshold value and small), the error e' is not output to the adder 17 by the threshold absolute evaluator 18, and the update amount of the weighting coefficient $w_m$ is not corrected.

In this manner, according to the present modified example, depending on the largeness (the state of movement of the target) of the error e', it is evaluated whether or not the error e' is to be used in correction of the update amount of the weighting coefficient $w_m$, any of the new algorithms due to normal NLMS is selectively performed, without using weight update algorithm or the error e'. Hence, since similar effects and benefits to the above described embodiment are obtained, and in addition, an appropriate weight update algorithm is applied in accordance with the movement state of the target, the following property to the target of a beam direction is more improved.

Figure 5:
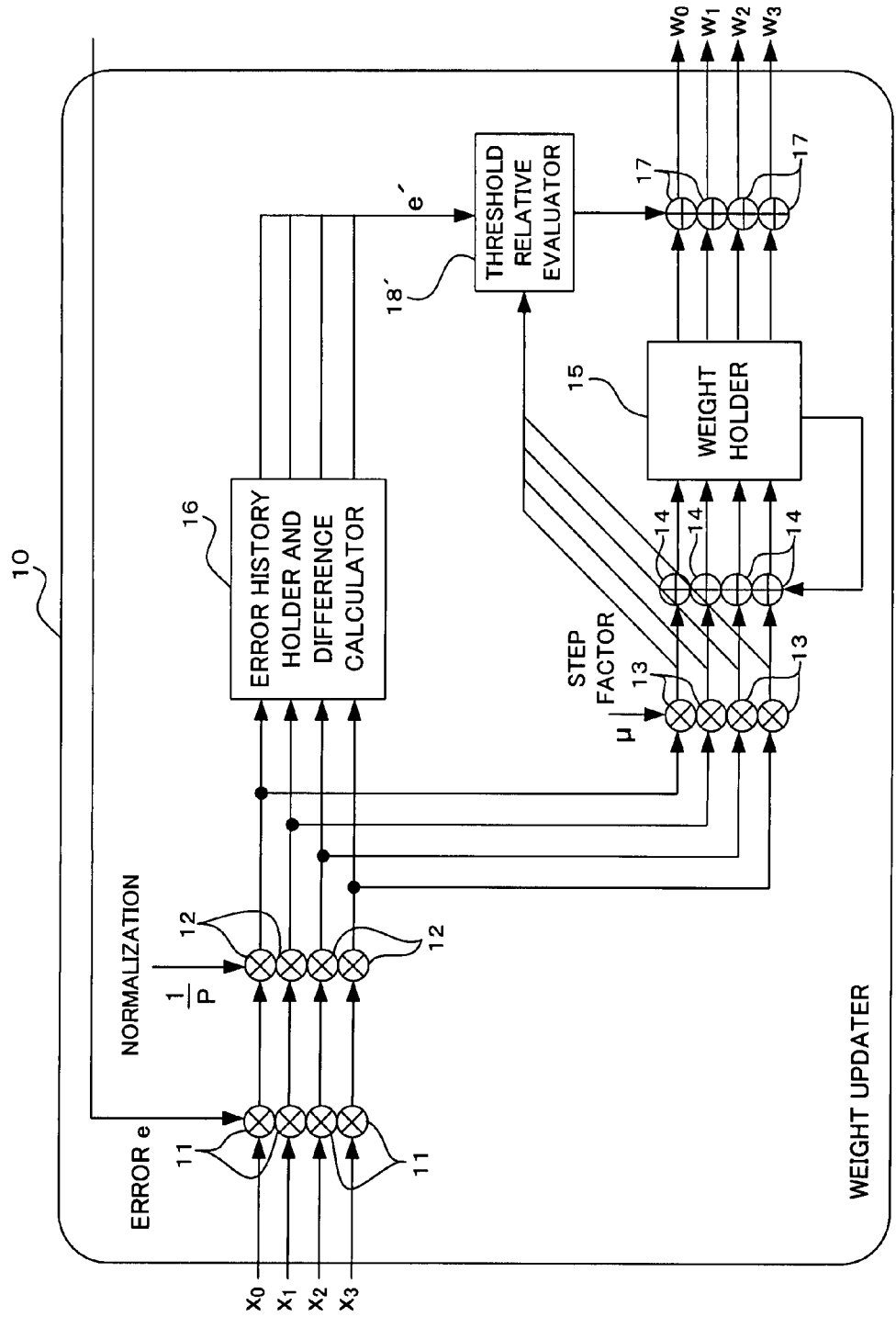
FIG. 5 is a block diagram showing a second modified example of the weight coefficient updater shown in FIG. 1.

[3] Second Modified Example:

FIG. 5 is a block diagram showing a second modified example of the weight updater 10 already described with reference to FIG. 1. In comparison with the construction of FIG. 1, the weight updater 10 shown in FIG. 5 differs in that a threshold relative evaluator 18' is provided for the output unit of the error history holder and difference calculator 16.

Here, the threshold absolute evaluator 18' also evaluates whether or not the update amount of the weighting coefficient $w_m$ is to be corrected with the error e', based on the error e' obtained by the error history holder and difference calculator 16. In the present example, by the threshold value comparison with respect to a proportion between the error e' obtained by the error history holder and difference calculator 16 with an output of the adder 13, that is, due to the threshold comparison with respect to the proportion of the weighting coefficient $w_m$ and the update amount $(x/P)\mu e_0$, it is decided whether or not the error e' is to be added to the adder 17. For example, if the radio of the error e' to the updating amount $(x/P)\mu e_0$ is not smaller than the threshold, the error e' is added to the adder 17, and if the proportion of the error e' to the updating amount $(x/P)\mu e_0$ is smaller than the threshold, the error e' is not output to the adder 17, and it is possible to perform updating of weighting coefficient $w_m$ with a normal update algorithm due to normal NMLS.

In this manner, in the present example, as in the case of the first modified example, it is possible to evaluate whether the error e' is to be used in correction of the updating of the weighting coefficient $w_m$ depending on the movement state of the target, and to selectively perform the weight update algorism using the error e' or the weight update algorithm due to normal NLMS not using the error e'. Thus, an appropriate weight update algorithm is applied in accordance with the movement state of the target, and the following property to the target of a beam direction is more improved.

Figure 6:
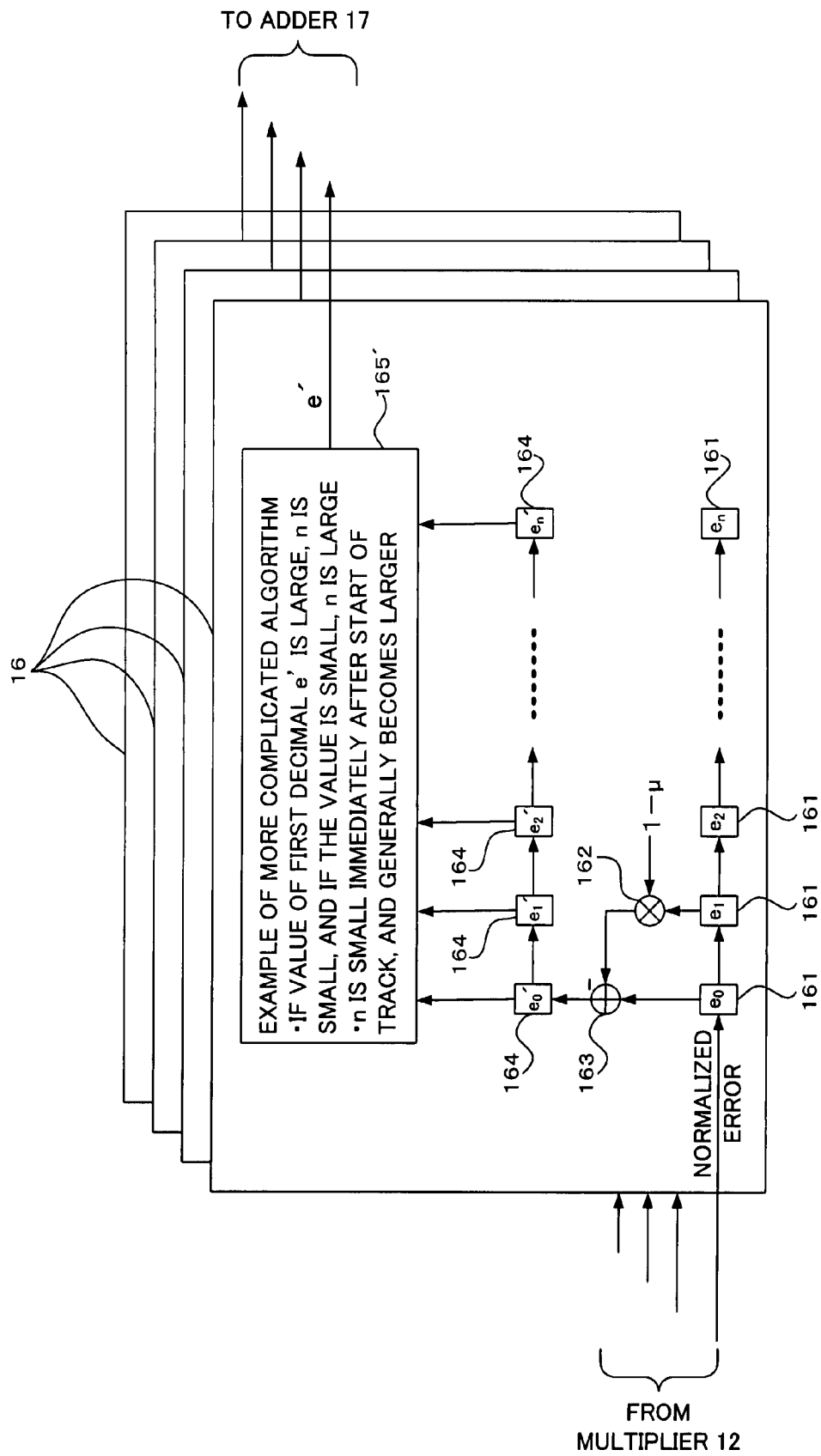
FIG. 6 is a block diagram showing a construction with attention paid to an error holder and difference calculator 16 as a third modified example of the above-described weight updater.
Figure 7:
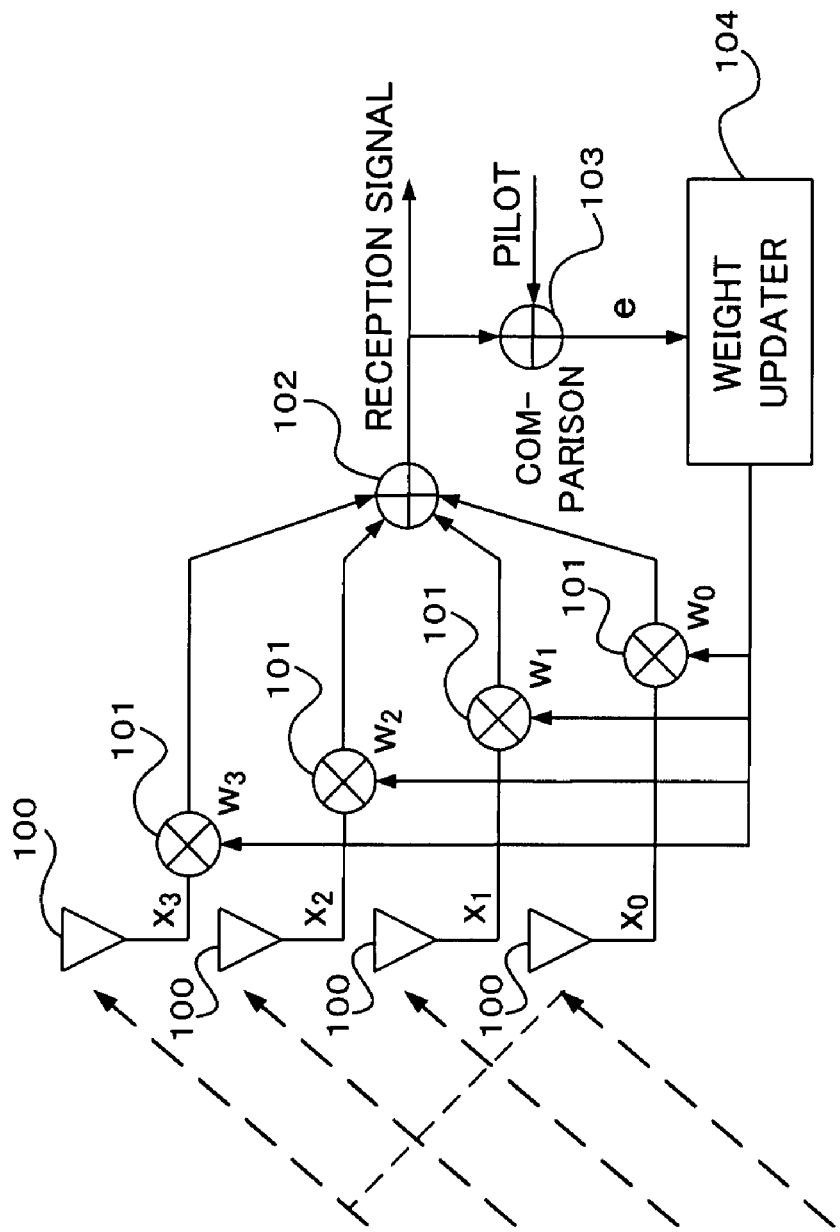
FIG. 7 is a block diagram showing a construction example of a previous array antenna (receiving system)
Figure 8:
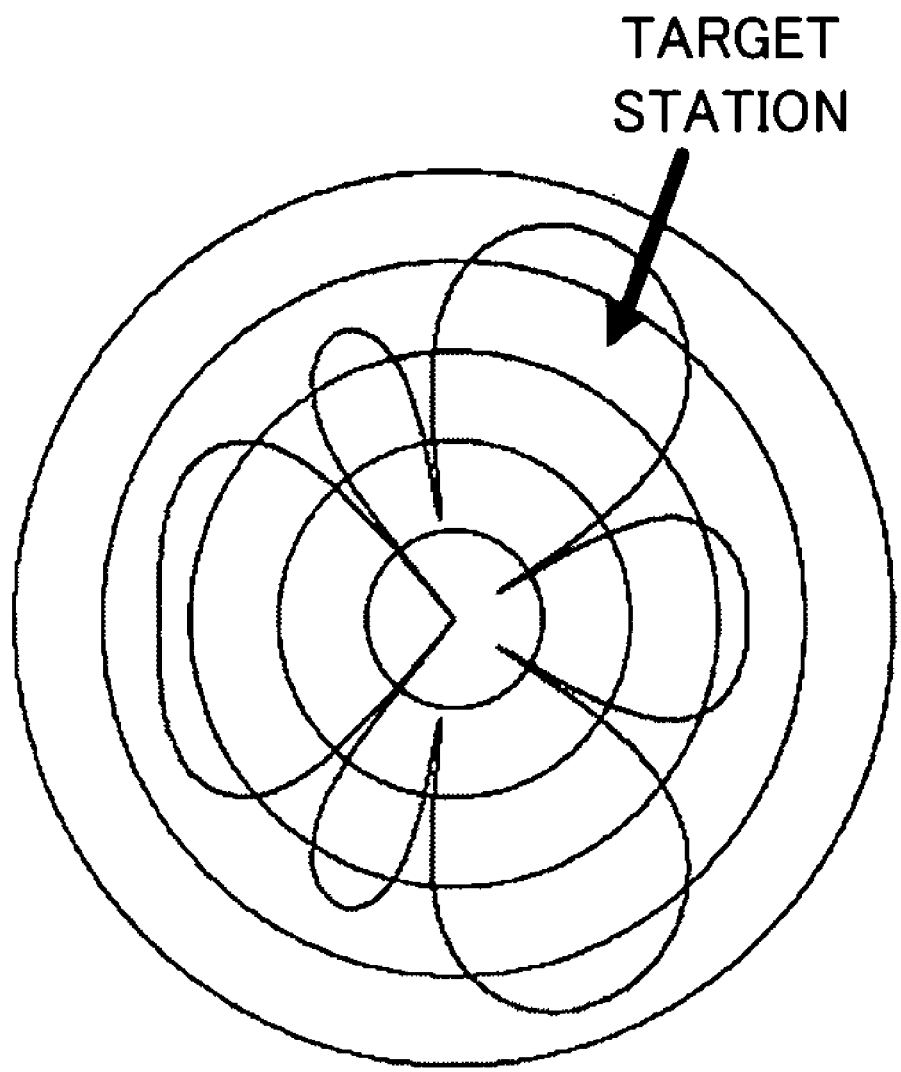
FIG. 8 is a diagram showing an example of the directivity of a previous array antenna.

[4] Third Modified Example:

FIG. 6 is a block diagram showing the construction with attention paid to the error history holder and difference calculator 16 as a third modified example of the weight updater 10 already described with reference of FIG. 1. In comparison with the construction in FIG. 2, the error history holder and difference calculator 16 of the FIG. 6, this error history holder and difference calculator 16 differ in that the average processor 165' is provided instead of the average processor 165.

Here, the average processor 165' has a function of a target error number adjuster which adjusts the number of history (the number of steps in past) n that is used to obtain the average. Hereby, it becomes possible to adjust whether greater importance is placed on the convergence speed (the tracking speed to the target) or making insensitive to noise (greater importance is placed on the improvement of safety of the following operation).

For example, if the value of the first minimal decimal error e' is not smaller than a predetermined threshold, it is considered that the target is being moving in high speed. Thus, the history number n, which is subjected to be averaged, is set to be small, thereby regarding the tracking speed as important. In contrast, if the value of e' is smaller than the threshold value, it is considered that the target is almost not being moving. Thus, by means of setting the history number n to a large value, it is possible to regard the stability of a tracking operation as important.

Further, the history number n, which is to be subjected to averaging, is set to be small immediately after tracking, and then after that, it is possible to generally make the history number larger. In this way, the calculation amount at the time of beginning of tracking can be restrained, so that it is possible to improve a response speed of directivity control at the time of beginning of tracking.

Further, at the time the average is taken, it is possible to obtain a weighted average of with the history of past while making gravity lower. In this way, it is possible to improve the tracking with respect to the practical target. In particular, when the history number n, which is subjected to be averaging, is fixed, it is considered to be effective.

[5] Transmission System

Although the above description is directed to a receiving system, the above method can be applied to a transmission system.

That is, for example, if a feedback of the error e can be obtained in the transmission system by comparison with a pilot signal, etc., the error e', which is a predict term as similar as the above, obtained from the error e, and the error e' is added to the weighting coefficient of the transmission system antenna. Hereby, as in the case of the receiving system described above, it becomes possible to accurately track the target which is being moving in high speed with a significant small amount of calculation.

In addition, being different from feedbacking the error e, the error e' obtained as described above in the receiving system or the weighting coefficient $w_m$ after being corrected can be fedback.

[6] Others:

The present invention should by no means be limited to the above-illustrated embodiment, and various changes or modifications may be suggested without departing from the gist of the invention.

For example, in the above-described example, the error history holder and difference calculator 16 calculates and stores the primary difference (the movement speed of the target) of the error e. However, the secondary difference (acceleration of the target: $e_0''$, $e_1''$, ..., $e_{n-1}''$) and the tertiary difference can be calculated and stored to correct the update amount of the weighting coefficient $w_m$.

As described above, according to the present invention, it is possible to control detail directivity of an array antenna with a small amount of calculation. Thus, since it is possible to accurately track the target which is being moving in high speed. Hence, it is considered that the invention is significantly useful in the field of radio communication. In particular, the present invention is extremely useful in the field of mobile communication.

What is claimed is:

1. An array antenna directivity control apparatus which changes directivity of a plurality of antennas by updating adaptively a weighting coefficient with respect to a signal of each of the antennas, said array antenna directivity control apparatus comprising:
    an error calculator which calculates an error between the antenna signal and a known reference signal;
    weighting coefficient updating means which updates the weighting coefficient based on the error calculated by said error calculator; and
    update amount correcting means which corrects the weighting coefficient calculated by said weighing coefficient updating means based on predict error information predicted on the basis of the error calculated in past by said error calculator, wherein said update amount correcting means comprises:
    a predict error information calculator which obtains the predict error information based on differences among a plurality of the errors in past; and
    an adder which performs the correction by means of adding the predict error information obtained by said predict error information calculator to the weighting coefficient updated by the weighting coefficient updating means, said predict error information calculator comprising:
    an error history holder which holds a plurality of the errors corresponding to a plurality of historical steps, respectively;
    a first calculator which calculates and stores a plurality of primary difference values, each of which is calculated based on two consecutive errors of the plurality of the error stored by said error history holder; and
    a second calculator which calculates and stores an average of the plurality of primary difference values stored in said first calculator, as the predict error information, and output the average to said adder.

2. An array antenna directivity control apparatus as set forth in claim 1, wherein said predict error information calculator obtains a primary difference with respect to the plurality of errors in past.

3. An array antenna directivity control apparatus as set forth in claim 1, wherein said predict error information calculator obtains an average of primary differences with respect to the plurality of errors in past.

4. An array antenna directivity control apparatus as set forth in claim 1, wherein said predict error information calculator obtains the predict error information based on a difference with respect to the normalized error.

5. An array antenna directivity control apparatus as set forth in claim 1, wherein said predict error information calculator obtains the predict error information based on an error which is obtained by multiplying an error used to obtain the amount of updating, obtained by said update amount correcting means, by an amount according to a predetermined updating width.

6. An array antenna directivity control apparatus as set forth in claim 1, wherein said update amount correcting means include:

an evaluator which evaluates whether or not the amount of updating is to be corrected by the predict error information based on the predicted error information obtained by said predict error information calculator.

7. An array antenna directivity control apparatus as set forth in claim 6, wherein said evaluator evaluates whether or not the amount of the updating is to be corrected by comparing the predict error information with threshold value of the amount of updating.

8. An array antenna directivity control apparatus as set forth in claim 6, wherein said evaluator evaluates whether or not the amount of updating is to be corrected by comparing a proportion of the amount of updating and the predict error information with threshold value of the proportion.

9. An array antenna directivity control apparatus as set forth in claim 1, wherein said predict error information calculator includes:

an object error number adjustor which adjusts the number of multiple errors in past used to obtain the predict error information.

10. An array antenna directivity control method which changes directivity of a plurality of antennas by updating adaptively a weighting coefficient of a signal of each of the antennas, the method comprising the steps of:

calculating an error between the antenna signal and a known reference signal;

updating the weighing coefficient based on the error calculated by said error calculator; and correcting the weighting coefficient calculated by said weighing coefficient updating step based on predict error information predicted on the basis of the error calculated in past by said error calculator, wherein said update correcting step comprises:

obtaining the predict error information based on differences among a plurality of the errors in past; and performing the correction by adding the predict error information obtained in said predict error information step to the weighting coefficient updated by the weighting coefficient updating step, said predict error information step comprising:

holding a plurality of the errors corresponding to a plurality of historical steps, respectively;

calculating and storing a plurality of primary difference values, each of which is calculated based on two consecutive errors of the plurality of the errors stored in said error history holding step; and calculating and storing an average of the plurality of primary difference values stored in said step of calculating and storing a plurality of primary difference values, as the predict error information, and outputting the average as the predict error information to the step of performing the correction.

* * * * *

UNITED STATES PATENT AND TRADEMARK OFFICE
CERTIFICATE OF CORRECTION

PATENT NO. : 7,564,407 B2  Page 1 of 1
APPLICATION NO. : 11/984363
DATED : July 21, 2009
INVENTOR(S) : Kazuki Yoshizoe and Takanori Iwamatsu It is certified that error appears in the above-identified patent and that said Letters Patent is hereby corrected as shown below:

On the title page under "Related U.S. Application Data", the data should be inserted to reflect as follows:

-- (63) Related U.S. Application Data:
Continuation of Application No. PCT/JP2005/009353, filed on May 23, 2005 --

Signed and Sealed this

Twenty-sixth Day of October, 2010

David J. Kappos
*Director of the United States Patent and Trademark Office*